United States Patent [19]

Dewey, Jr.

[11] 3,988,593
[45] Oct. 26, 1976

[54] NONLINEAR AMPLIFYING
[75] Inventor: C. Forbes Dewey, Jr., Belmont, Mass.
[73] Assignee: Massachusetts Institute of Technology, Cambridge, Mass.
[22] Filed: Apr. 15, 1975
[21] Appl. No.: 568,533

[52] U.S. Cl. .............................. 307/88.3; 321/69 R
[51] Int. Cl.² ...................... H03F 7/04; G02F 1/39
[58] Field of Search .................. 307/88.3; 321/69 R; 331/107 R

[56] References Cited
UNITED STATES PATENTS

| | | | |
|---|---|---|---|
| 3,384,433 | 5/1968 | Bloembergen | 307/88.3 UX |
| 3,407,309 | 10/1968 | Miller | 307/88.3 |
| 3,842,289 | 10/1976 | Yariv et al. | 307/88.3 |

OTHER PUBLICATIONS

Tang et al., "IEEE Journal of Quantum Electronics," Jan. 1973, pp. 9–13.
Yacoby et al., "J. Applied Physics," July 1973, pp. 3180–3181.
van der Ziel, "Applied Physics Letters," Jan. 15, 1975, pp. 60–61.

*Primary Examiner*—R. V. Rolinec
*Assistant Examiner*—Darwin R. Hostetter
*Attorney, Agent, or Firm*—Arthur A. Smith, Jr.; Charles Hieken; Robert Shaw

[57] ABSTRACT

One or more lasers direct one or more beams of radiant energy upon a nonlinear crystal having a sequence of rotational twin planes parallel to each other and perpendicular to the incident beams to produce an output beam at predetermined frequency at relatively high power level that may be detected or used in a suitable utilization device. Preferably the twin planes in the crystal are separated from each other by uniform spacing related to the coherence length for the nonlinear process being employed so that the power enhancement is proportional to the number of twin planes squared.

12 Claims, 6 Drawing Figures

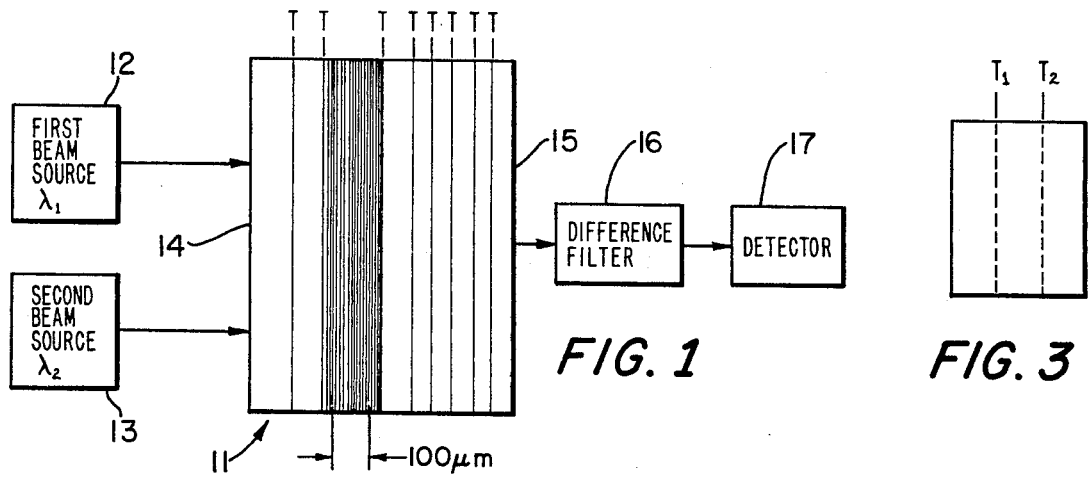
FIG. 1
FIG. 3
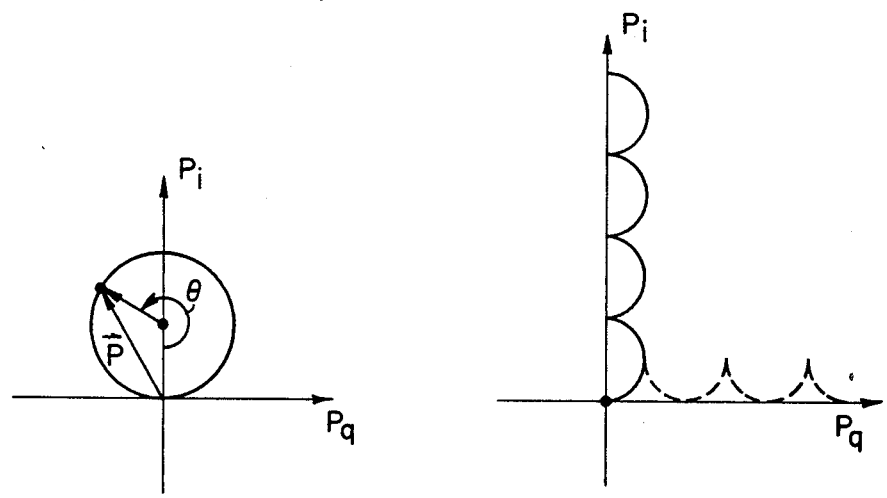
FIG. 2A
FIG. 2B
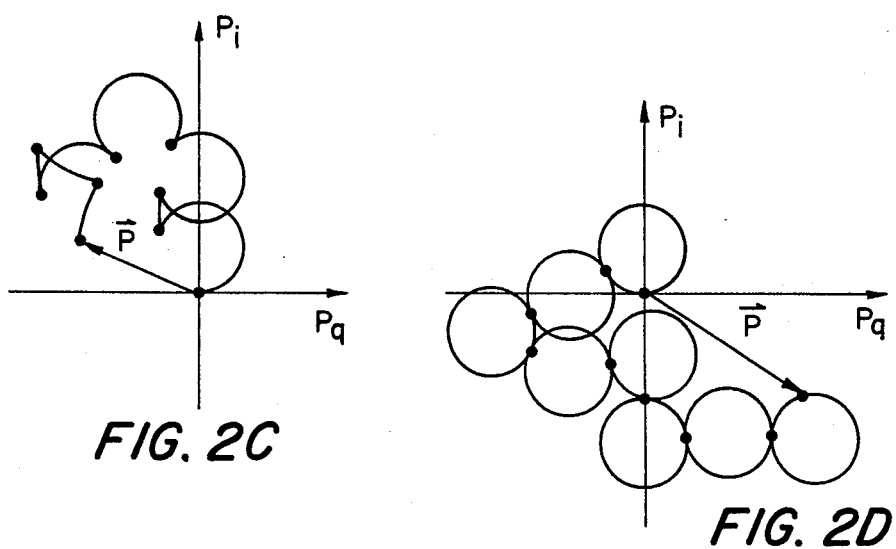
FIG. 2C
FIG. 2D

NONLINEAR AMPLIFYING

This invention was developed in the course of work performed under a contract with the Department of the Army and under a contract with the Department of the Navy.

BACKGROUND OF THE INVENTION

The present invention relates in general to nonlinear optical signal processing and more particularly concerns novel apparatus and techniques for nonlinearly processing optical signals with crystals having a sequence of rotational twin planes to appreciably enhance output power with a compact structure that is relatively easy and inexpensive to fabricate and is capable of handling relatively high levels of power over a wide range of wavelengths. Crystals with rotational twin planes are normally considered undesirable by those skilled in the art who prefer single domain crystals. The invention uses these crystals with rotational twin planes to provide an essentially monochromatic optical source tunable over a range greater than five octaves, believed to be a continuous tuning range at optical and near optical wavelengths significantly greater than that previously achieved.

In optical systems using laser sources it is often desirable to transfer the high spectral brightness of a laser at one wavelength to another wavelength different from the first (pump) wavelength. Typical mixing media include nonlinear optical materials such as transparent crystals and atomic vapors using the property of phase matching. The optical wave generated in the nonlinear medium must be in a proper phase relationship to the primary optical beams which excite the nonlinear effect.

Typical nonlinear interactions include frequency doubling, generation of difference frequencies, up-conversion and parametric oscillation. A difficulty with the prior art techniques is the relatively low power provided by the nonlinear devices.

Bloembergen (U.S. Pat. No. 3,384,433) and other prior art typically disclose that phase matching may be achieved by making crystals with the refractive index or nonlinear coefficient or slabs of material possessing specific lattice orientation periodically disposed along the axis of propagation of the optical beams. The prior art fails to disclose practically acceptable methods of obtaining or manufacturing the periodic material.

Accordingly, it is an important object of this invention to provide practical methods and means for nonlinearly processing optical signals.

It is a more specific object of the invention to provide improved methods and means for nonlinearly processing optical signals.

It is a further object of the invention to achieve one or more of the preceding objects while providing higher power output.

It is a further object of the invention to achieve one or more of the preceding objects with inexpensive crystals of a type generally regarded as scrap capable of handling relatively high optical power levels.

It is a further object of the invention to achieve one or more of the preceding objects by using crystals having a sequence of rotational twin planes.

SUMMARY OF THE INVENTION

According to the invention, there is crystal means having a sequence of generally parallel rotational twin planes for nonlinearly processing incident radiant energy, means for launching at least one radiant energy wave in a direction having a component generally perpendicular to the plane of the twin planes and means for utilziing the nonlinearly processed radiant energy after the incident radiant energy has passed through at least one rotational twin plane. Preferably, the nonlinearly processed radiant energy is utilized after passing through all the twin planes in the crystal. Preferably, the separation between twin planes is uniform and equal to or larger than the coherence length for the nonlinear process being employed.

In a more specific form of the invention, first and second substantially monochromatic radiant energy beams of different wavelengths, such as provided by first and second lasers, enter an input face of the crystal along the 111 axis, and a difference-frequency signal leaves through an exit face of the crystal opposite the entrance face and enters filter means for selectively transmitting the difference-frequency signal to utilization means, such as a photodetector.

Numerous other features, objects and advantages of the invention will become apparent from the following specification when read in connection with the accompanying drawing in which:

BRIEF DESCRIPTION OF THE DRAWING

FIG. 1 is a combined block-pictorial representation of a system according to the invention showing an enlarged side view of a crystal with some twin planes indicated;

FIGS. 2A–2D are graphical representations of the net polarization in crystal material as a function of the variable $\theta$; $\theta$ is equal to $\pi x/l_c$, where x is the distance into the sample along the direction of propagation of the incident wave energy and $l_c$ is the coherence length for the desired nonlinear interaction; and FIG. 3 is an enlarged side view of a crystal having three uniformly spaced intervals separated by a pair of rotational twin planes.

DETAILED DESCRIPTION OF PREFERRED EMBODIMENTS

With reference now to the drawing and more particularly FIG. 1 thereof, there is shown a block diagram illustrating the logical arrangement of a system according to the invention in which a crystal, 11, shown in an enlarged side view, nonlinearly processes input radiant energy provided by a first beam source of wavelength $\lambda_1$, 12, and a second beam source of wavelength $\lambda_2$, 13, normally incident upon input face 14, and provides an output signal that exits through output face 15 of wavelength $(\lambda_1^{-1} - \lambda_2^{-1})^{-1}$ that is transmitted by filter 16 to detector 17 or other utilization device. Some of the rotational twin planes are designated by the letter T; however, since they are only a number of microns apart and there are a hundred or more in a typical crystal, only a few are shown to avoid obscuring the principles of the invention. These twin planes may be those which naturally occur in a grown crystal, such as a ZnSe crystal, perpendicular to the 111 axis of the crystal upon which the radiant energy travels from input face 14 to output face 15.

A feature of a crystal according to the invention is that it is characterized by all the features important for transferring the high spectral brightness of a laser from one wavelength to another in connection with frequency doubling, parametric oscillation, difference-frequency generation and other higher order processes. Practical nonlinear crystals used in the invention are transparent to radiant energy wavelengths of interest, have a high damage threshold for handling relatively high power levels, possess a high nonlinear coefficient, and are phase-matchable for the nonlinear processes employed.

It has been discovered that the naturally-occurring phenomenon of rotational twin planes in cubic crystals of a type frequently regarded as scrap may be employed to achieve phase-matching while retaining the advantages just described above. The invention represents a practical realization of concepts previously identified as desirable; however, the prior proposed implementations are impractical. Rotational twin planes may be described as the intersection of two segments of a crystal which are related by a 60° rotation about the 111 axis. An optical beam having a component propagating in the 111 direction in a cubic crystal containing rotational twin planes T perpendicular to the direction of propatation will experience a reversal of the direction of the nonlinear polarization at each twin plane boundary This reversal occurs because the nonlinear polarization rotates twice as fast as the linear polarization, but in the opposite direction; i.e., a 60° rotation of the crystal leads to a 180° rotation of the direction of the nonlinear polarization. Thus, an electric field having a component applied perpendicular to the 111 direction produces a nonlinear polarization whose component perpendicular to the 111 direction points in opposite directions on the two sides of a twin plane. The 111 propagation direction is preferred; however, the principles of the invention apply to any propagation direction having a component perpendicular to the planes of the rotational twin planes. Suitable crystals include those in the $\overline{4}3_m$ symmetry classification.

The nonlinear optical properties of a crystal containing rotational twin planes are equivalent optically to those of a stack of optically-contacted and oriented plates of thicknesses equal to the twin plane spacing. Growing crystals with regularly-spaced rotational twin planes produces a practical realization of periodic phase matching of the type suggested by Bloembergen in U.S. Pat. No. 3,384,433. The specific structure primarily proposed by Bloembergen has presented practical difficulties in producing a large number of thin elements having the proper thickness, orientation and optical quality.

The principles of the invention will be better understood from the following discussion. Referring to FIG. 2A, there is shown a diagramatic representation of the path of the net polarization in a nonlinear crystal without twin planes as a function of the variable $\theta$ related to the distance $x$ into the crystal along the direction of propagation. $P_i$ is that component of the net nonlinear polarization in phase with the nonlinear polarization at the beginning of the sample and $P_q$ is the quadrature component. The path of the vector is circular and its angular orientation, $\theta$, on the circle is $\pi x/l_c$, where $x$ is the distance into the sample along the direction of propagation and $l_c$ is the coherence length that corresponds to the nonlinear process of interest. For example, for the mixing system of FIG. 1, if the first beam source is a ruby laser and the second beam source is a dye laser such that their difference frequency is 4$\mu$m, and if in addition the crystal is ZnSe, the coherence length $l_c$ is approximately 2$\mu$m.

Referring to FIG. 2B, there is shown the path of the net polarization vector when the planes are regularly spaced by the coherence length. At each twin plane the incremental polarization reverses sign, but continues to dephase at the same rate with the result that the net polarization is multiplied by the number of twinning planes crossed by the radiant energy, and the output power is then essentially proportional to the square of the number of regularly spaced twin planes. The broken path is the path of the net polarization when the twin planes occur at odd multiples of half the coherence length, the plate separation suggested as most desirable in the aforesaid Bloembergen patent. Inasmuch as the magnitude, not the phase of the net polarization determines the nonlinear optical power, both spacings give nearly identical results.

Normal methods of crystal growth produce rotational twin planes with uneven spacing. Referring to FIG. 2C, there is shown the path of polarization changes in the manner of a complicated random walk which typically occur in a crystal having unevenly separated rotational twin planes with the separation between adjacent planes being of the order of the coherence length. Referring to FIG. 2D, there is shown the polarization changes which occur with unevenly spaced rotational twin planes when the separation between adjacent planes is large compared to the coherence length. The magnitude of the net polarization after traversing N twin planes of random spacing larger than about $0.5l_c$ is $|\vec{P}|(NP)^{1/2}$, where p is the net polarization in a slab one coherence length thick. Inasmuch as the power radiated by the nonlinear polarization is proportional to $|\vec{P}|^2$, the nonlinear optical power radiated from a crystal having randomly spaced twin planes will be greater than that radiated by a crystal one coherence length thick by a factor equal to N.

An actual embodiment of the invention produced infrared difference frequency radiation in a ZnSe crystal having randomly spaced twin planes when energized by a Q-switched ruby laser and a ruby-pumped dye laser as the sources 12 and 13 in a system described in *Applied Physics Letters*, 18, 58 (1971). The ZnSe crystal contained about 150 parallel rotational twin planes perpendicular to the 111 direction with separations greater than 2$\mu$m. The separations are readily measurable because the twin planes can be easily identified from the side of the crystal. The coherence length ranged from 2 $\mu$m to 3 $\mu$m depending upon which IR difference frequency was being generated. The measured improvement in power output as compared with a sample without twin planes one coherence length thick was 250 as compared with a theoretically expected improvement of 150. This value is in reasonable agreement with the enhancement factor of 150 predicted for randomly spaced rotational twin planes having 150 twin planes separated by more than half the coherence length.

The laser dyes used were DTTC, DOTC and DTDC in DMSO and aqueous-surfactant solutions such as described in *Appl. Phys. Lett.*, 12, 206 (1968) and IEEE J. *Quant. Elect.*, QE-9, 1119 (1973). Difference-frequency generation was observed over the continuously tunable wavelength range 4 $\mu$m to 21 $\mu$m, with a peak power of about 5 watts at 4$\mu$m and about 0.5 watts at 21$\mu$m. The decrease of power at longer wavelenths is attributable in part to a decrease in dye laser power from DTDC mixtures, and in part to a decrease in the number of twin planes larger than $0.5l_c$ ($l_c \approx 30\mu$m at a free-space wavelength of 21$\mu$m). The ratio of infrared power to dye laser power, $P_{ir}/P_d$ with randomly spaced rotational twin planes is proportional to $Nl_c^2/\lambda_{ir}^2$; for ruby-laser-dye laser difference frequency generation in ZnSe, $l_c$ increasing nearly linearly with $\lambda_{ir}$ so that $P_{ir}/P_d$ would be expected to be approximately independent of wavelength if the effective value of N were constant.

This continuously tunable range of over 5 octaves achieved with the invention is believed to be significantly greater than the continuously tunable range ever previously achieved with prior art techniques. The ruby laser frequency remained constant while the dye laser frequency was varied by varying cavity length.

When a ZnSe crystal without twin planes was substituted for the crystal having 150 rotational twin planes, a peak power of 1mW was observed at 4$\mu$m. This specimen was slightly wedged so that no Maker fringes were observed. The infrared power from a plane-parallel crystal slab at a fringe maximum would therefore be 2mW or 250 times smaller than the measured power output of the crystal according to the invention having randomly spaced twin planes, a value in reasonable agreement with the enhancement factor of 150 predicted according to the principles of the invention for a crystal with 150 randomly-spaced twin planes larger than half the coherent length. The reason for the actual improvement being better than that predicted based on purely random separation is not definitely known; however, it may be that some of the spacings between planes may be very close to a multiple of half the coherence length.

Confirmation that the observed signal sensed by detector 17 was indeed of difference frequency was done in the usual manner -- by tuning the infrared output wavelength through the narrow passband of a multiple layer dielectric filter comprising filter 16, observing absence of the signal when either the ruby or dye beam was blocked and seeing the disappearance of the signal when the IR wavelengthh was tuned into the ZnSe absorption edge at 22$\mu$m.

All of the above experiments were performed with a surface power density of about 10MW/cm². Using this power density, an overlap area of 0.1 cm² for the beams of wavelength $\lambda_1$ and $\lambda_2$, the nonlinear coefficient of Soref and Moos described in J. Appl. Phys., 35, 2152 (1964), and the coherence length appropriate to 4$\mu$m mixing, the crystal without twin planes produced about ¼ of the power predicted by theory, a discrepancy frequently observed in mixing experiments of this type. The actual test conducted demonstrated the effectiveness of using crystals with rotational twin planes as a means for changing the phase of nonlinear polarization inside the crystal. Additional cubic crystals suitable for nonlinear mixing processes with both regularly and irregularly spaced rotational twin planes include GaSb, CdTe, InAs, GaAs, InP, GaP, ZnS and the copper halides.

Referring to FIG. 3, there is shown an enlarged side view of an embodiment of the invention having three equal intervals between entrance face 21 and exit face 22 of nonlinear crystal 24 bounded by rotational twin planes $T_1$ and $T_2$. A method of making the embodiment of FIG. 3 comprises taking a slice from a crystal having a pair of rotational twin planes, such as $T_1$ and $T_2$ separated by the coherence length $l_c$ and polishing faces parallel to these rotational twin planes so that entrance face 21 and exit face 22 are separated from rotational twin planes $T_1 T_2$, respectively, by the coherence length $l_c$. The crystal of FIG. 3 may be expected to provide a nonlinear optical power that is four times that radiated from an untwinned sample one coherence length thick.

There has been described novel apparatus and techniques for appreciably enhancing the available power from nonlinear processing of radiant energy in crystals in taking advantage of a sequence of rotational twin planes in a nonlinear crystal transparent at the wavelengths of interest, having a high damage threshold, possessing a high nonlinear coefficient and phase-matchable for the mixing processes employed. The invention is capable of achieving enhancement from a crystal of a type that has normally been considered scrap that is unavailable from other crystals.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A method of nonlinearly processing radiant energy which method includes the steps of,
    applying a beam of essentially monochromatic radiant energy to a nonlinear crystal that is transparent to said radiant energy having at least one rotational twin plane along a propagation direction having a component perpendicular to said plane,
    and utilizing the nonlinearly processed radiant energy after passing through at least said one rotational twin plane.

2. A method of nonlinearly processing radiant energy in accordance with claim 1 and further including the steps of selectively detecting a predetermined wavelength of the utilized radiant energy after passing through at least said one rotational twin plane.

3. A method of nonlinearly processing radiant energy in accordance with claim 1 and further including the step of directing radiant energy upon an input face of said crystal from a plurality of beams in overlapping relationship along an 111 axis of said crystal perpendicular to said plane.

4. A method of nonlinearly processing radiant energy in accordance with claim 2 and further including the step of directing radiant energy upon an input face fo said crystal from a plurality of beams in overlapping relationship along an 111 axis of said crystal perpendicular to said plane.

5. Apparatus for practicing the method of claim 1 comprising,
    said nonlinear crystal,
    a source of said radiant energy,
    and utilizing means for utilizing the nonlinearly processed radiant energy separated from said source by said crystal.

6. Apparatus in accordance with claim 5 wherein said nonlinear crystal has means including at least two successive rotational twin planes defining contiguous radiant energy path segments of equal length corresponding to a multiple of half the coherence length.

7. Apparatus in accordance with claim 5 wherein said nonlinear crystal is made of material from the group consisting of ZnSe, GaSb, CdTe, InAs, InP, GaP, ZnS and the copper halides.

8. Apparatus in accordance with claim 5 wherein said source of radiant energy comprises a source of a first fixed frequency radiant energy beam and a second radiant energy beam of variable frequency and further comprising, means for directing said first and second radiant energy beams of first and second frequencies respectively in at least partially overlapping relationship in a direction having a component perpendicular to said at least one rotational twin plane to produce a radiant energy beam of difference frequency corresponding to the difference between said first and second frequencies, and means for selectively transmitting said radiant energy beam of difference frequency to said utilizing means.

9. Apparatus in accordance with claim 8 wherein said source comprises a ruby laser providing said first beam and a tunable dye laser providing said second beam.

10. A method of nonlinearly processing radiant energy in accordance with claim 1 and further including the steps of, applying a second beam of essentially monochromatic radiant energy to said nonlinear crystal along a propagation direction having a component perpendicular to said plane in at least partially overlapping relationship with said first-mentioned beam of frequency different from that of said first-mentioned beam to produce a difference frequency beam of radiant energy of frequency corresponding to the difference between the frequencies of said first-mentioned beam and said second beam, and selectively transmitting said difference frequency beam to means for utilizing the latter.

11. A method of nonlinearly processing radiant energy in accordance with claim 1 and further including the step of directing radiant energy upon an input face of said crystal from a plurality of beams in overlapping relationship along a propagation direction having a component perpendicular to said plane.

12. A method of nonlinearly processing radiant energy in accordance with claim 11 and further including the step of selectively detecting a predetermined wavelength of the utilized radiant energy after passing through at least said one rotational twin plane.

* * * * *